(12) United States Patent
Kontermann et al.

(10) Patent No.: US 12,576,681 B2

(45) Date of Patent: Mar. 17, 2026

(54) WHEEL SUSPENSION FOR A WHEEL OF A VEHICLE

(71) Applicant: ZF Friedrichshafen AG, Friedrichshafen (DE)

(72) Inventors: Peter Kontermann, Osnabrück (DE); Arnold Gurr, Osnabrück (DE); Markus Laile, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/841,610

(22) PCT Filed: Jan. 31, 2023

(86) PCT No.: PCT/EP2023/052305
§ 371 (c)(1),
(2) Date: Aug. 26, 2024

(87) PCT Pub. No.: WO2023/160970
PCT Pub. Date: Aug. 31, 2023

(65) Prior Publication Data
US 2025/0162370 A1 May 22, 2025

(30) Foreign Application Priority Data

Feb. 28, 2022 (DE) ..................... 10 2022 202 016.2

(51) Int. Cl.
*B60G 15/06* (2006.01)

(52) U.S. Cl.
CPC ...... *B60G 15/068* (2013.01); *B60G 2200/142* (2013.01); *B60G 2200/44* (2013.01); *B60G 2204/419* (2013.01)

(58) Field of Classification Search
CPC .................. B60K 17/043; B60K 17/14; B60K 2007/0061; B60G 2204/419; B60G 2200/44; B60G 2200/142; B60G 15/068
See application file for complete search history.

(56) References Cited

U.S. PATENT DOCUMENTS 9,731,572 B2 8/2017 Tamura et al.
10,414,264 B2 9/2019 Tamura et al.
(Continued)

FOREIGN PATENT DOCUMENTS

DE 10 2009 054 821 A1 6/2011
DE 10 2015 207 074 A1 10/2016
(Continued)

OTHER PUBLICATIONS

Fehr, Steering System And Axle Arrangement For A Vehicle, Aug. 23, 2018, EPO, DE 102017202697 A1, Machine Translation of Description (Year: 2018).*
(Continued)

*Primary Examiner* — Paul N Dickson
*Assistant Examiner* — Matthew D Lee
(74) *Attorney, Agent, or Firm* — Finch & Maloney PLLC

(57) ABSTRACT

A wheel suspension is provided for a wheel of a vehicle. In one example, the suspension has a wheel carrier with a wheel bearing, and a wheel hub is rotatably mounted in the wheel bearing and rotatable about a wheel axis of the wheel carrier. A steering mechanism is configured for adjusting a wheel steering angle, where the wheel carrier can be rotated about a rotation axis that is orientated transversely to the wheel axis. To enable the wheel bearing and/or the wheel to be driven, and/or to improve an arrangement of a drive unit and/or the connection of the drive unit, the wheel suspension has a drive unit configured for driving the wheel hub and (Continued)

arranged on the wheel carrier. A drive axle of the drive unit is a distance away from the wheel axle.

14 Claims, 5 Drawing Sheets

(56) References Cited

U.S. PATENT DOCUMENTS

| | | | | |
|---|---|---|---|---|
| 10,435,067 | B2 | 10/2019 | Neu et al. | |
| 11,167,611 | B2 | 11/2021 | Kontermann et al. | |
| 12,179,861 | B1 * | 12/2024 | Thomas | B60R 16/0231 |
| 2007/0193791 | A1 * | 8/2007 | Komatsu | H02K 7/083 |
| | | | | 180/55 |
| 2007/0209852 | A1 * | 9/2007 | Kamiya | B60G 3/20 |
| | | | | 180/65.51 |
| 2014/0011620 | A1 | 1/2014 | Munster et al. | |
| 2018/0272855 | A1 * | 9/2018 | Tamura | B60B 35/14 |
| 2019/0054785 | A1 * | 2/2019 | Keuser | F16C 27/063 |
| 2019/0193504 | A1 * | 6/2019 | Yamada | B60G 3/20 |
| 2019/0337382 | A1 * | 11/2019 | Yu | B60K 17/14 |
| 2020/0331339 | A1 * | 10/2020 | Nagayama | B60G 15/00 |

FOREIGN PATENT DOCUMENTS

| | | | | | |
|---|---|---|---|---|---|
| DE | 102017202697 | A1 * | 8/2018 | | |
| DE | 10 2018 002 855 | A1 | 10/2019 | | |
| DE | 10 2020 117 438 | A1 | 1/2022 | | |
| DE | 102022202016 | B3 * | 6/2023 | | B60G 15/068 |
| DE | 102023205697 | A1 * | 11/2024 | | B60B 27/0052 |
| EP | 2993066 | A1 * | 3/2016 | | B60G 15/062 |
| EP | 3061640 | A1 * | 8/2016 | | |
| JP | 2004090822 | A | 3/2004 | | |
| WO | WO-2005030509 | A1 * | 4/2005 | | B60G 13/16 |
| WO | WO-2016119015 | A1 * | 8/2016 | | A63B 55/30 |

OTHER PUBLICATIONS

German Patent Office, Office Action issued in German patent application No. 10 2022 202 016.2 (Dec. 5, 2022).

European Patent Office, International Search Report issued in International patent application No. PCT/EP2023/052305 (Apr. 28, 2023).

European Patent Office, Written Opinion issued in International patent application No. PCT/EP2023/052305 (Apr. 28, 2023).

* cited by examiner

WHEEL SUSPENSION FOR A WHEEL OF A VEHICLE

RELATED APPLICATIONS

This application claims the benefit under 35 U.S.C. § 371 as a U.S. National Phase Application of application no. PCT/EP2023/052305, filed on 31 Jan. 2023, which claims the benefit of German Patent Application no. 10 2022 202 016.2 filed on 28 Feb. 2022, the contents of which are hereby incorporated herein by reference in their entireties.

FIELD OF THE DISCLOSURE

The invention relates to a wheel suspension for a wheel of a vehicle, with a wheel carrier, wherein the wheel carrier comprises a wheel bearing and where a wheel hub is mounted in the wheel carrier so that it can rotate about a wheel axis of the wheel carrier, and with a steering mechanism for adjusting a wheel steering angle, such that by means of the steering mechanism the wheel carrier can rotate about a rotation axis orientated perpendicularly relative to the wheel axis.

BACKGROUND

Such a wheel suspension is known from DE 10 2015 203 632 A1 or DE 10 2018 002 855 A1. Those wheel suspensions are notable in that compared with the usual wheel suspensions they allow substantially larger steering angles or wheel steering angles. Thanks to the larger wheel steering angle the maneuverability or agility of a vehicle fitted with such a wheel suspension is greater. In particular a turning circle is substantially smaller than with conventional wheel suspensions. In the prior art mentioned the wheel suspensions for producing larger wheel steering angles are fitted on non-driven axles of the vehicle. Owing to the kinematics of a wheel suspension with a particularly large wheel steering angle, it is not easy to connect the suspension to an ordinary drive axle in order to drive the wheel bearing or the wheel. However, it is desirable to be able to drive a wheel bearing or wheel even when attached to a wheel suspension that allows a larger wheel steering angle.

SUMMARY

The present invention is based on the objective of developing further a wheel suspension of the type mentioned to begin with, in such manner as to enable the driving of the wheel bearing and/or the wheel. Preferably, an arrangement of a drive unit and/or a connection of the drive unit is/are improved. In particular, an alternative embodiment is provided.

The objective upon which the invention is based is achieved with a wheel suspension as disclosed herein. Preferred further developments of the invention emerge from the present disclosure.

The wheel suspension is designed to fit a wheel on a vehicle, in particular a motor vehicle. The wheel suspension comprises a wheel carrier, wherein the wheel carrier has a wheel bearing and a wheel hub is mounted to rotate in the wheel bearing about a wheel axis of the wheel carrier. The wheel carrier can be made of metal or a fiber-reinforced plastic. In particular the wheel bearing is designed to arrange the wheel or hold it rotationally fixed. Preferably the wheel is arranged on the wheel bearing or connected rotationally fixed to the wheel bearing. In particular the wheel is mounted to rotate by means of the wheel hub about the wheel axis. The wheel suspension comprises a steering mechanism for adjusting a wheel steering angle. In this case, by virtue of the steering mechanism the wheel carrier can rotate about a rotation axis directed perpendicularly to the wheel axis. In particular, the rotation axis is a vertical axis.

According to the invention, a drive unit for driving the wheel hub is arranged on the wheel carrier, and a drive axis of the drive is a distance away from the wheel axis.

In this case it is advantageous that, owing to the separation between the drive axis and the wheel axis, and despite the restricted fitting space in the wheel suspension, the drive unit can be arranged on the wheel carrier in order to realize a large wheel steering angle. In particular, owing to the arrangement on the wheel carrier the drive unit is positioned close to the wheel. Moreover, the otherwise usual fitting space for a drive unit can be used for some other purpose, for example for providing a larger trunk space. Preferably, the drive axis is directed parallel or transversely to the wheel axis.

In particular, the wheel suspension is designed to enable a maximum wheel steering angle of more than 50°. In particular, the wheel suspension enables a maximum wheel steering angle of up to 70° or up to 80°.

In a further embodiment the drive unit for driving the wheel hub co-operates with a transmission wheel connected rotationally fixed to the wheel hub. In particular, the drive unit is connected by way of a step-down gear to the wheel hub and/or to the step-up gear. Thus, a driving force or movement torque from the drive unit can be transmitted via the step-down gear to the transmission wheel and thence to the wheel hub and finally to a wheel fitted onto the wheel hub. In particular, the drive unit for driving the wheel hub is in the form of an electric drive or an electric motor. Preferably, a rotation axis of the step-up gear coincides with the wheel axis of the wheel bearing and the wheel hub.

The transmission wheel can be in the form of a belt wheel. When the transmission wheel is a belt wheel, the belt wheel is connected to a drive output wheel of the drive unit by means of a belt. By virtue of the belt, vibrational and/or acoustic decoupling is enabled between the drive unit and the transmission wheel in the form of a belt wheel and/or the wheel carrier. Preferably, the drive output wheel of the drive unit has a smaller diameter than the belt wheel of the wheel hub. By virtue of an appropriate choice of the diameters of the drive output wheel and the belt wheel, a desired transmission ratio can be adjusted or specified.

Alternatively, the transmission wheel can be in the form of a gearwheel, preferably a spur gearwheel. The transmission wheel in the form of a gearwheel is connected to a drive output gearwheel of the drive unit. In particular, the drive output gearwheel of the drive unit has a smaller diameter than the gearwheel of the wheel hub. By virtue of an appropriate choice of the diameters of the drive output gearwheel and the gearwheel of the wheel hub, a desired transmission ratio can be adjusted or specified.

According to a further development the drive unit is positioned between a shock-absorber connected to the wheel carrier and the steering mechanism. In particular the drive unit is arranged between the shock-absorber connected to the wheel carrier and at least one chassis control arm of the steering mechanism. In this case the at least one chassis control arm of the steering mechanism is articulated to the wheel carrier. The at least one chassis control arm can be in the form of a track rod, a transverse control arm or a coupling rod.

In particular, a wheel is connected rotationally fixed to the wheel hub and the drive unit is arranged at least partially or completely within a free inside wheel space of the wheel. Preferably, the wheel has a wheel rim and the drive unit is arranged at least partially or completely within the wheel rim and/or a free inside wheel space of the wheel rim.

In a further embodiment, between the drive unit and the wheel carrier there is arranged a decoupling device. In that way, by means of the decoupling device the transmission of vibrations from the drive unit to the wheel carrier is damped and/or reduced. In particular, the decoupling device is designed to decouple vibrations and/or to provide acoustic decoupling between the drive unit and the wheel carrier. Accordingly, a transmission of vibrations into the vehicle and/or into a chassis of the vehicle can be damped and/or reduced. Preferably, the decoupling device comprises an elastomer layer or a plurality of elastomer layers.

Preferably, the wheel carrier has at least one connection point for attaching the drive unit. In this case a fixing section of the drive unit is attached to the connection point. The connection point and/or the fixing section comprises the elastomer layer. The drive unit has a drive housing, such that the drive housing has or forms the fixing section. In particular the wheel carrier has a plurality of connection points. For example, a single fixing section of the drive unit can have at least two connection points. At least one fixing section of the drive unit can in each case be fixed to the respective connection point. For example, a single fixing section of the drive unit can be attached to a single connection point of the wheel carrier. Alternatively, or in addition, two fixing sections of the drive unit can be attached to a single connection point of the wheel carrier. The at least one connection point can comprise a bearing eye or a bearing eye on the connection point side. In particular, the connection point is in the form of a bearing eye or a bearing eye on the connection point side.

Preferably, the elastomer layer is in the form of a rubber sleeve layer. In particular a rubber material of the rubber sleeve layer is arranged between an inner wall of a bearing eye and an outer wall of an inner sleeve of the rubber layer. In an inexpensive manner, such a rubber sleeve layer thus enables the drive unit to be decoupled from the wheel carrier. The bearing eye can be made as part of the fixing section of the drive unit, or it can be formed by the fixing section itself. The fixing section of the drive unit can comprise the bearing eye or a bearing eye on the drive input side.

According to a further embodiment, the steering mechanism comprises a track rod, a transverse control arm, a first coupling rod, and a second coupling rod. The first and second coupling rods are articulated to one another. Moreover, the second coupling rod and the wheel carrier are articulated to one another. To introduce a steering torque, the track rod is articulated to the first coupling rod. The first coupling rod is also articulated to the transverse control arm. In particular, the first coupling rod is connected with the transverse control arm exclusively so that it can rotate, so that the first coupling rod has only one degree of rotational freedom. The steering torque can be transmitted by the first coupling rod via the second coupling rod to the wheel carrier. The transverse control arm is articulated to the wheel carrier, and in addition the transverse control arm is or can be connected to a vehicle body or a vehicle chassis. The transverse control arm can be in the form of a wishbone control arm. Owing to the kinematics so obtained, wheel steering angles in excess of 50° are enabled.

Preferably, a shock-absorber is connected rotationally fixed to the wheel carrier. In particular, the disposition of the shock-absorber on the wheel carrier realizes a MacPherson suspension strut arrangement. The drive unit is arranged close to the shock-absorber and above the transverse control arm. Preferably, for fixing the drive unit the shock-absorber is arranged or fixed to the wheel carrier under a first connection point and above at least one further connection point of the wheel carrier. In particular, the terms "above" and "below" refer to a wheel suspension fitted into a vehicle.

BRIEF DESCRIPTION OF THE DRAWINGS

Below, the invention is explained in greater detail with reference to the figures, in which the same indexes denote the same, similar, or functionally equivalent components. The figures show.

DETAILED DESCRIPTION

Figure 1:
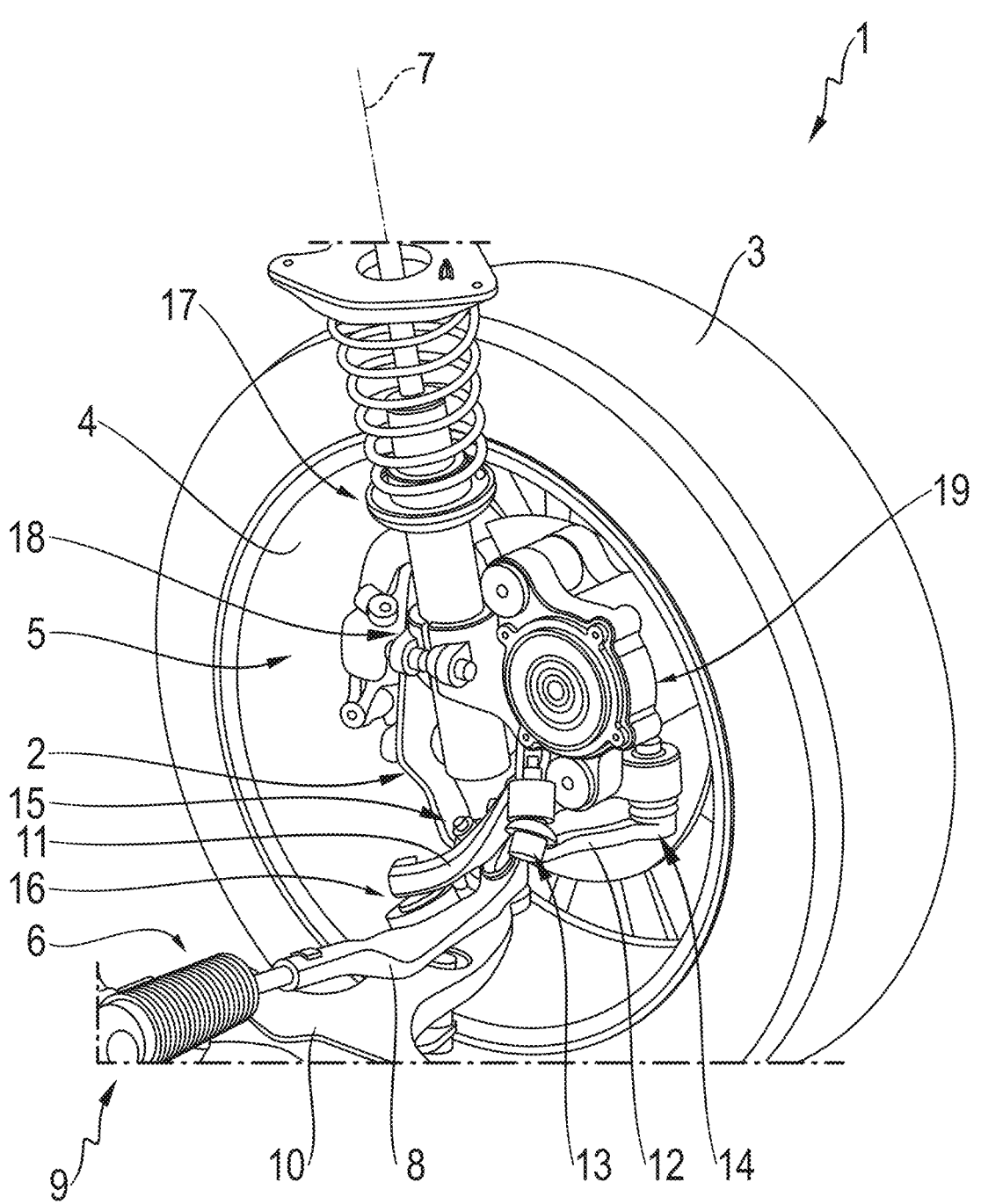
FIG. 1: Part of a perspective first side-view of a wheel suspension according to the invention.

FIG. 1 shows part of a perspective first side-view of a wheel suspension 1 according to the invention. The wheel suspension 1 comprises a wheel carrier 2. The wheel suspension 1 is designed for a vehicle (no more of which is shown here). In this example embodiment a wheel 3 is fitted to rotate on the wheel carrier 2. The wheel 3 has a wheel rim 4. The wheel carrier 2 is arranged essentially inside an inner wheel space 5 of the wheel 3 or the wheel rim 4. The wheel suspension 1 also comprises a steering mechanism 6 for adjusting a wheel steering angle. By virtue of the steering mechanism 6 the wheel carrier 2 is mounted to rotate about a rotation axis 7 (here, represented only schematically).

In this example embodiment, the steering mechanism 6 comprises a track rod 8. The track rod 8 is connected to a steering drive 9 (no more of which is shown here). Furthermore, the steering mechanism 6 comprises a transverse control arm 10. In this example embodiment the transverse control arm 10 is essentially in the form of a wishbone transverse control arm. In the example embodiment shown here, the transverse control arm is arranged under the track rod 8. Furthermore, the steering mechanism 6 comprises a first coupling rod 11 and a second coupling rod 12. A first end of the first coupling rod 11 is articulated by means of a first joint 13 to a first end of the second coupling rod 12. A second end of the second coupling rod 12 remote from its first end is articulated by means of a second joint 14 to the wheel carrier 2. To introduce a steering movement the track rod 8 is articulated to the first coupling rod 11. For that purpose, an end of the track rod 8 remote from the steering drive 9 is connected by means of a third joint 15 to a point approximately mid-way between the two ends of the first coupling rod 11. A second end of the first coupling rod 11 remote from the second coupling rod 12 is articulated to the transverse control arm 10 by means of a fourth joint 16. In this case the first coupling rod 11 is mounted exclusively rotatably by the fourth joint 16, so that the first coupling rod 11 has only one degree of rotational freedom.

In this example embodiment, the wheel suspension 1 comprises a shock-absorber 17. The shock-absorber 17 is connected rotationally fixed to the wheel carrier 2. For that purpose, the wheel carrier 2 has a suitably designed connection point 18. In this example embodiment, by virtue of the shock-absorber 17 the wheel suspension 1 corresponds to a so-termed MacPherson suspension strut.

The wheel suspension 1 comprises a drive unit 19. By means of the drive unit 19 the wheel 3 can be driven. In this example embodiment the drive unit 19 is in the form of an electric drive or electric motor. The drive unit 19 is arranged or fixed on the wheel carrier 2. The drive unit 19 is arranged at least partially or completely within the inside wheel space 5 of the wheel 3 or its rim 4.

Figure 2:
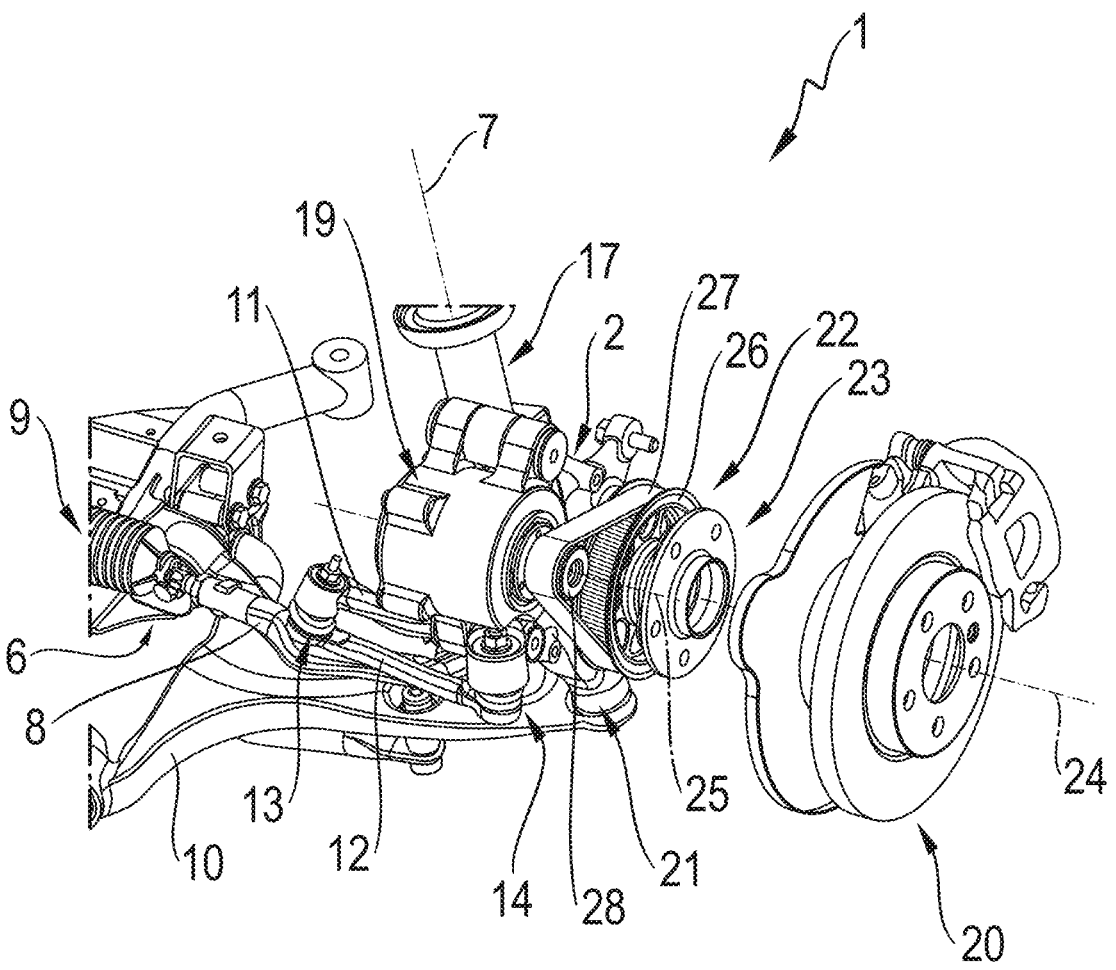
FIG. 2: Part of a perspective second side-view of the wheel suspension according to the invention, as in FIG. 1, FIG. 3: Part of a perspective and sectioned third side-view of the wheel suspension according to the invention, as in FIGS. 1 and 2, FIG. 4: Part of a perspective fourth side-view of the wheel suspension according to the invention, as in FIGS. 1 to 3, FIG. 5: Part of a perspective and sectioned further side-view of the wheel suspension according to the invention, as in FIGS. 1 to 4.

FIG. 2 shows part of a perspective second side-view of the wheel suspension 1 according to FIG. 1. For the sake of greater clarity, in this case the wheel suspension 1 is shown with a detached brake disk unit 20. Furthermore, for the sake of greater clarity the wheel 3 with its rim 4 have been omitted. The same features are denoted by the same indexes as before. Accordingly, to avoid repetition reference should also be made to the previous description.

It can be seen that the transverse control arm 10 is connected to the wheel carrier 2 by a fifth joint 21.

The wheel carrier 2 has a wheel bearing 22, and a wheel hub 23 in the wheel carrier 2 is mounted to rotate about a wheel axis 24 of the wheel carrier 2. The wheel axis 24 is directed transversely relative to the rotation axis 7.

A drive axis 25 is associated with the drive unit 19. The drive axis 25 is a distance away from the wheel axis 24. In this example embodiment, the wheel axis 24 and the drive axis 25 are directed parallel to and a distance apart from one another. Thus, the wheel axis 24 and the drive axis 25 do not coincide.

The wheel suspension 1 comprises a transmission wheel 26. The transmission wheel 26 is connected rotationally fixed to the wheel hub 23. The drive unit 19 co-operates with the transmission wheel 26 to drive the wheel hub 23. In this example embodiment the transmission wheel 26 is in the form of a belt wheel. The transmission wheel 26 in the form of a belt wheel is connected by way of a belt 27 to a drive output wheel 28 of the drive unit 19. In this example embodiment the drive output wheel 28 has a smaller diameter than the transmission wheel 26 in the form of a belt wheel. In that way a step-down transmission is realized, by which the drive unit 19 is connected to the wheel hub 23.

As an alternative to the example embodiment shown here, the transmission wheel 26 can be in the form of a gearwheel or a spur gear, and then a transmission wheel 26 designed in that way can be connected directly to a drive output gearwheel instead of to the drive output wheel 28 of the drive unit 19. In such a case the transmission wheel 26 in the form of a gearwheel engages directly in the drive output gearwheel of the drive unit 19. Thus, in this alternative embodiment there is no need for a belt 27.

However, in the embodiment shown here, with the transmission wheel 26 in the form of a belt wheel, it is advantageous that thanks to the belt 27 vibrational decoupling between the drive unit 19 and the wheel carrier 2 and the wheel hub 23 can be realized.

The drive unit 19 is arranged between the shock-absorber 17 connected to the wheel carrier 2 and the steering mechanism 6 or the transverse control arm 10.

Figure 3:
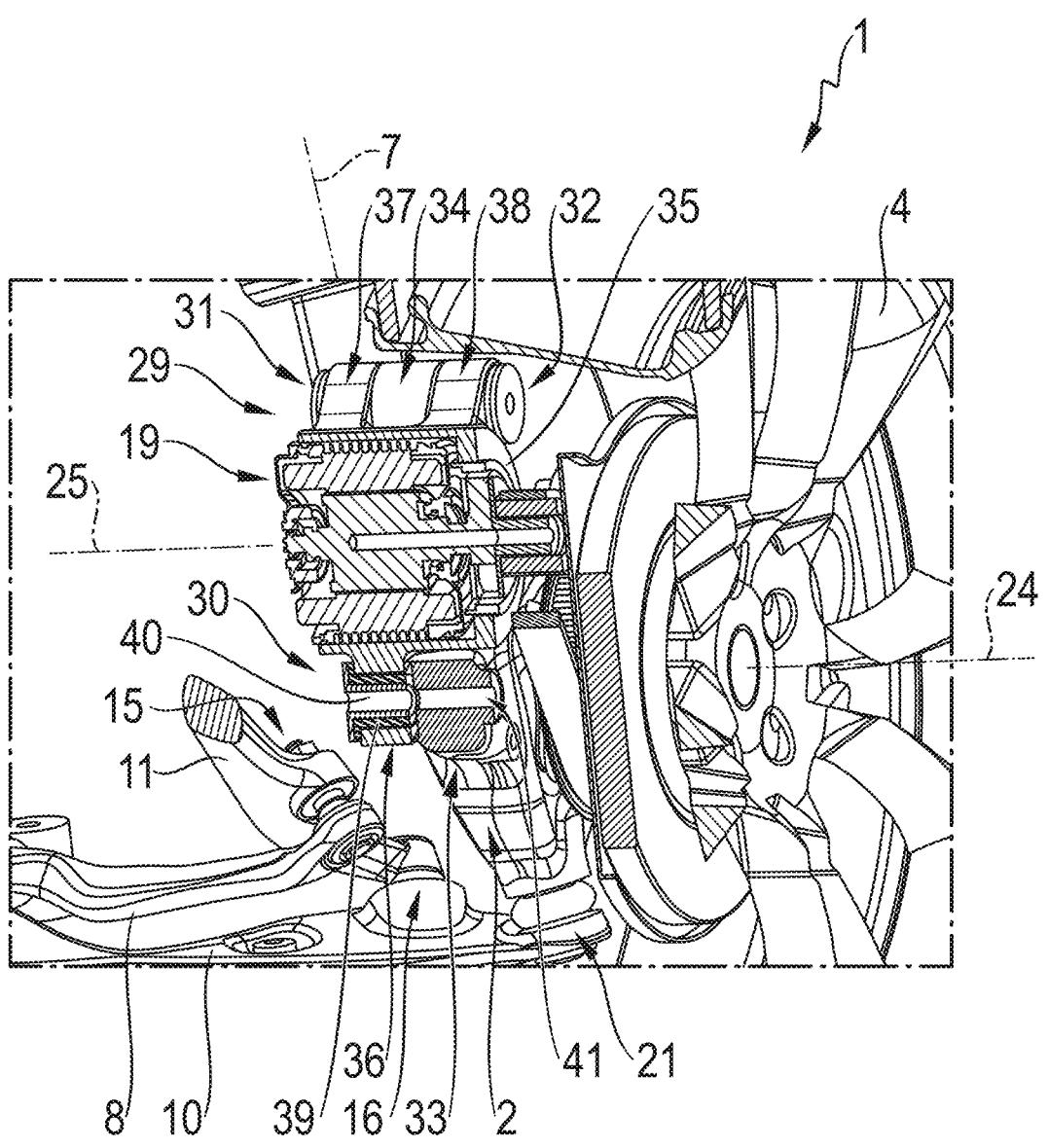

FIG. 3 shows part of a perspective and sectioned third side-view of the wheel suspension 1 according to the invention as shown in FIGS. 1 and 2. The same features have the same indexes as before. Accordingly, to avoid repetition reference should also be made to the previous description.

Between the drive unit 19 and the wheel carrier 2 is arranged a decoupling device 29. By means of the decoupling device 29 vibration decoupling between the drive unit 19 and the wheel carrier 2 can be realized. Thus, the transmission of vibrations from the drive unit 19 to the wheel carrier 2 is damped or reduced by the decoupling device 29. In this example embodiment, the decoupling device 29 has a multi-component design. In this example embodiment, the decoupling device 29 comprises three elastomeric layers 30, 31 and 32.

In this example embodiment, the wheel carrier 2 has two connection points 33, 34. The connection points 33, 34 serve to attach the drive unit 19. For that purpose the drive unit 19 or a housing 35 of the drive unit 19 has a plurality, namely, in this example embodiment three fixing sections 36, 37, and 38. The fixing sections 36, 37, 38 are each in the form of a bearing eye on the drive input side. In the fixing sections 36, 37, 38 there is arranged in each case an elastomer layer 30, 31, 32. In this example embodiment, the elastomer layers 30, 31, 32 are in the form of a rubber sleeve mounting. The elastomer layer 30 and the fixing section 36 are associated with the connection point 33. Furthermore, in this example embodiment the two elastomer layers 32, 32 and the two fixing sections 37, 38 are associated with the connection point 34.

As can be seen in this sectioned representation, the elastomer layer 30 is made from a rubber material 39 arranged between an inner wall of the fixing section 36 and having the form of a bearing eye on the drive input side and an outer wall of an inner sleeve 40 of the elastomer layer 30. A through-going opening 41 extends both through the elastomer layer 30 and through the connection point 33. In the assembled condition fixing means (not shown in any detail here) such as a screw extend through the through-going opening 41, whereby the drive unit 19 is held reliably onto the wheel carrier 2. The screw can for that purpose co-operate with a threaded nut (not shown).

In this example embodiment, the rubber material 39 and the inner sleeve 40 of the elastomer layer 30 extend beyond a rim facing away from the connection point 33. Accordingly, the rubber material 39 and the inner sleeve 40 have a T-shaped cross-section.

Figure 4:
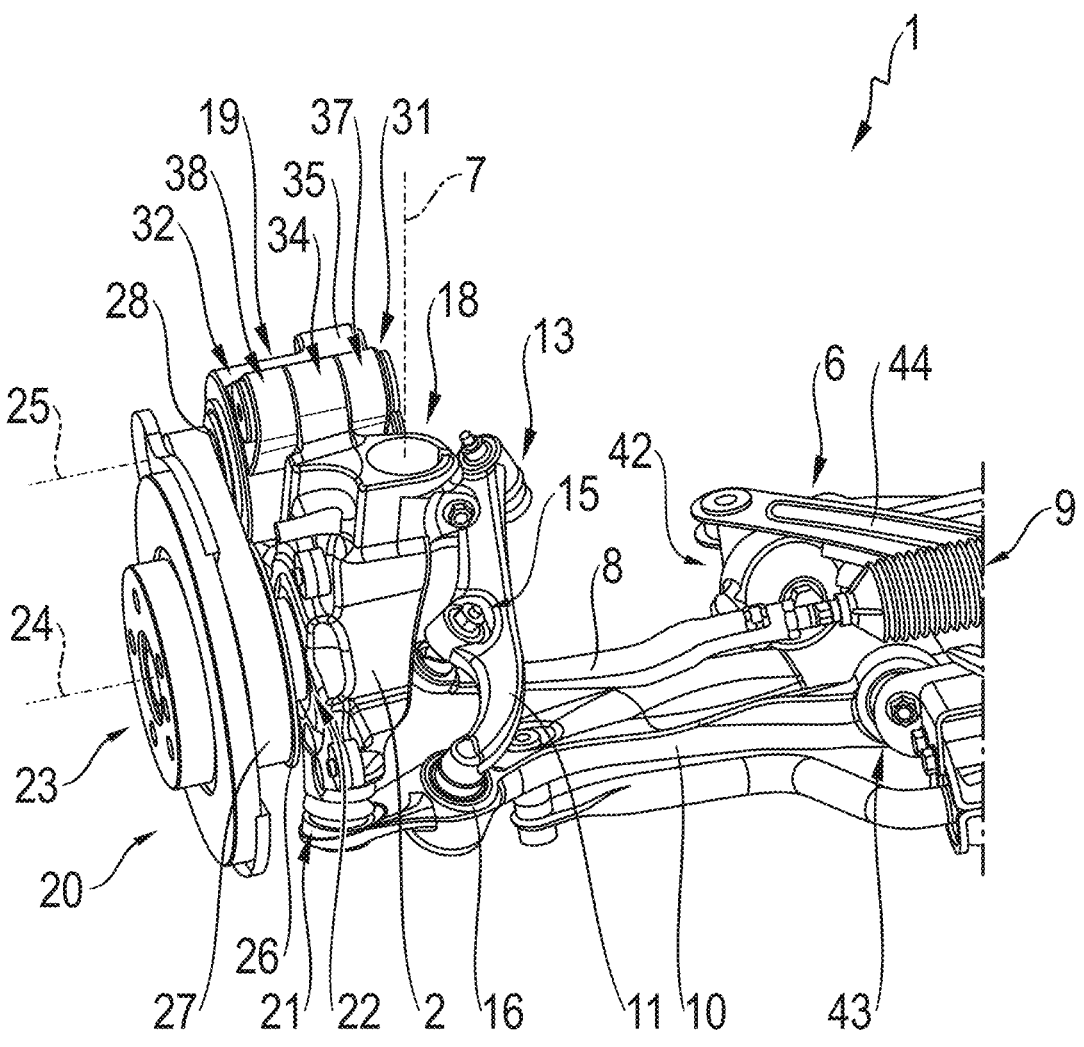

FIG. 4 shows part of a perspective fourth side-view of the wheel suspension 1 according to the invention illustrated in FIGS. 1 to 3. The same features have the same indexes as before. Thus, to avoid repetition reference should again be made to the earlier description. For the sake of greater simplicity, the shock-absorber 17 and the wheel 3 have been omitted.

On one side the transverse control arm 10 is articulated to the wheel carrier 2 by way of the fifth joint 21. On the other side the transverse control arm 10 is connected and articulated to a vehicle chassis 44 by means of a sixth joint 42 and a further joint 43. By virtue of the three articulated connections 21, 42, 43, in this example embodiment the transverse control arm 10 is in the form of a wishbone transverse control arm.

Furthermore, it can be seen clearly here that the connection point 43 of the wheel carrier 2 in this example embodiment is arranged between the two fixing sections 37 and 38 of the housing 35 of the drive unit 19.

Figure 5:
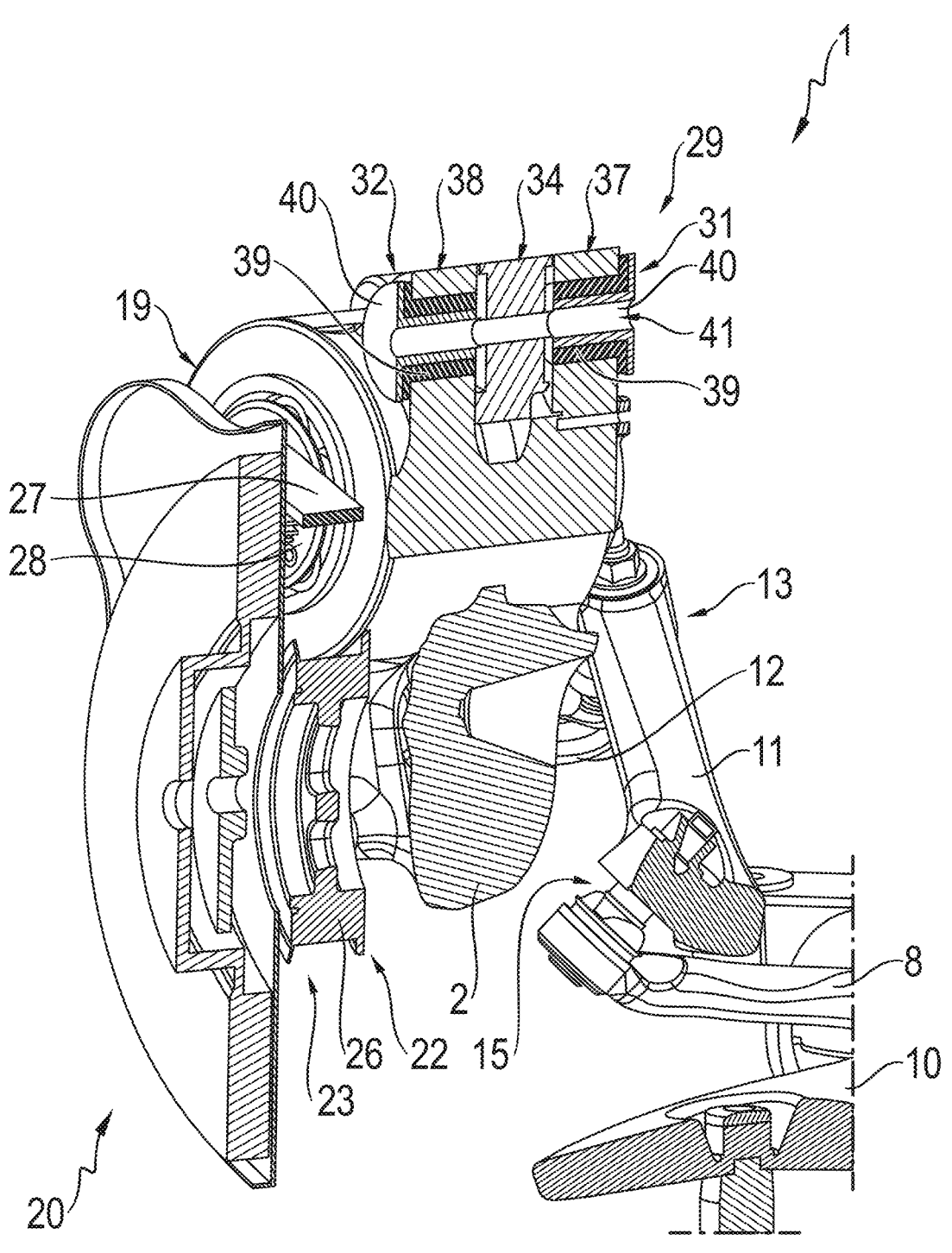

FIG. 5 shows part of a further perspective and sectioned side-view of the wheel suspension 1 according to FIGS. 1 to 4. The same features have the same indexes as before. Thus, to avoid repetition reference should also be made to the earlier description. Here too, for greater simplicity the wheel 3 and its rim 4 are omitted.

The structure of the elastomer layers 31, 32 corresponds in each case to the structure of the elastomer layer 30 in FIG. 3. In this example embodiment, the through-going opening 41 extends through the two elastomer layers 31, 32 and through the connection point 34 positioned mid-way between the two elastomer layers 31, 32. In the assembled condition a fixing means (not shown here) such as a screw with a threaded nut as its counter-component extends through the through-going opening 41. Thereby, the drive unit 19 or its housing 35 is reliably fixed to the connection point 34. At the same time, by virtue of the rubber material 39 between the inner sleeve 40 of the two elastomer layers 31, 32 and the fixing sections 37, 38 in the form of bearing eyes on the drive input side, vibration decoupling between the drive unit 19 and the wheel carrier 2 is realized.

INDEXES

1 Wheel suspension
2 Wheel carrier
3 Wheel
4 Wheel rim
5 Inside space of the wheel
6 Steering mechanism
7 Rotation axis
8 Track rod
9 Steering drive
10 Transverse control arm
11 First coupling rod
12 Second coupling rod
13 First joint
14 Second joint
15 Third joint
16 Fourth joint
17 Shock-absorber
18 Connection point
19 Drive unit
20 Brake disk mechanism
21 Fifth joint
22 Wheel bearing
23 Wheel hub
24 Wheel axis
25 Drive unit axis
26 Transmission wheel
27 Belt
28 Drive output wheel
29 Decoupling device
30 Elastomer layer
31 Elastomer layer
32 Elastomer layer
33 Connection point
34 Connection point
35 Housing
36 Fixing section
37 Fixing section
38 Fixing section
39 Rubber material
40 Inner sleeve
41 Through-going opening
42 Sixth joint
43 Further joint
44 Vehicle chassis

The invention claimed is:

1. A wheel suspension for a wheel of a vehicle, comprising:
a wheel carrier having a wheel bearing and a wheel hub mounted rotatably in the wheel bearing and rotatable about a wheel axis of the wheel carrier;
a steering mechanism configured for adjusting a wheel steering angle, wherein the wheel carrier can be rotated by the steering mechanism about a rotation axis orientated transversely to the wheel axis, wherein the steering mechanism comprises:
a track rod;
a transverse control arm;
a first coupling rod and a second coupling rod,
wherein the first coupling rod is articulated to the second coupling rod;
wherein the second coupling rod is articulated to the wheel carrier;
wherein the track rod is articulated to a point between the ends of the first coupling rod in order to introduce a steering torque;
wherein the first coupling rod is articulated to the transverse control arm and the steering torque can be transmitted from the first coupling rod via the second coupling rod to the wheel carrier; and
wherein the transverse control arm is articulated to the wheel carrier and the transverse control arm can be articulated to a vehicle body or to a vehicle chassis; and
a drive unit configured for driving the wheel hub and attached to the wheel carrier at connection points, wherein a drive unit axis of the drive unit is spaced from the wheel axle.

2. The wheel suspension according to claim 1, further comprising a transmission wheel connected rotationally fixed to the wheel hub, wherein the drive unit for driving the wheel hub co-operates with the transmission wheel.

3. The wheel suspension according to claim 2, wherein the transmission wheel is in the form of a belt wheel and the belt wheel is connected by way of a belt to a drive output wheel of the drive unit, and wherein the drive output wheel of the drive unit has a smaller diameter than the belt wheel of the wheel hub.

4. The wheel suspension according to claim 2, wherein the transmission wheel is in the form of a gearwheel connected to a drive output gearwheel of the drive unit, and wherein the drive output gearwheel of the drive unit has a smaller diameter than the gearwheel of the wheel hub.

5. The wheel suspension according to claim 1, wherein the drive unit is arranged between a shock-absorber connected to the wheel carrier and the steering mechanism, and wherein a wheel is attached rotationally fixed to the wheel hub and the drive unit is arranged partially or completely inside a free inner wheel space of the wheel.

6. The wheel suspension according to claim 1, comprising:
a decoupling device having one or more elastomeric layers, the decoupling device positioned between the drive unit and the wheel carrier, whereby the transmission of vibrations of the drive unit to the wheel carrier is damped and/or reduced.

7. The wheel suspension according to claim 1, wherein the wheel carrier has at least one connection point configured for attaching the drive unit, wherein a fixing section of the drive unit is attached to the connection point, and the connection point and/or the fixing section comprises an elastomer layer.

8. The wheel suspension according to claim 7, wherein the elastomer layer is in the form of a rubber sleeve, and wherein a rubber material of the rubber sleeve is between an inner wall of a bearing eye and an outer wall of an inner sleeve of the rubber sleeve, and wherein the fixing section is in the form of the bearing eye.

9. The wheel suspension according to claim 1, comprising:

a shock-absorber connected rotationally fixed to the wheel carrier;

wherein the drive unit is arranged close to the shock-absorber and above the transverse control arm; and wherein the shock absorber is arranged on the wheel carrier under a first connection point and above at least one further connection point of the wheel carrier for attaching the drive unit.

10. The of claim 2, wherein the drive unit is connected by way of a step-down transmission to the wheel hub and/or to the transmission wheel.

11. The wheel suspension according to claim 1, comprising:

a decoupling device positioned between the drive unit and the wheel carrier, whereby the transmission of vibrations of the drive unit to a chassis of the vehicle is damped and/or reduced.

12. The wheel suspension according to claim 11, wherein the decoupling device comprises one or more elastomer layers.

13. The wheel suspension according to claim 6, wherein the decoupling device comprises one or more elastomer layers.

14. The wheel suspension according to claim 7, wherein the wheel carrier has a plurality of connection points, such that in each case at least one fixing section of the drive unit is attached to the respective connection point of the plurality of connection points.

* * * * *